United States Patent
Berggren et al.

(10) Patent No.: US 7,843,176 B2
(45) Date of Patent: *Nov. 30, 2010

(54) APPARATUS AND METHOD FOR IMPROVED POWER FLOW CONTROL IN A HIGH VOLTAGE NETWORK

(75) Inventors: Bertil Berggren, Väaterås (SE); Mojtaba Noroozian, Tehran (IR)

(73) Assignee: ABB Research Ltd., Zürich (CH)

( * ) Notice: Subject to any disclaimer, the term of this patent is extended or adjusted under 35 U.S.C. 154(b) by 662 days.

This patent is subject to a terminal disclaimer.

(21) Appl. No.: 11/661,248

(22) PCT Filed: Aug. 27, 2004

(86) PCT No.: PCT/SE2004/001241

§ 371 (c)(1),
(2), (4) Date: Oct. 29, 2007

(87) PCT Pub. No.: WO2006/022576

PCT Pub. Date: Mar. 2, 2006

(65) Prior Publication Data

US 2008/0157748 A1    Jul. 3, 2008

(51) Int. Cl.
    *G05F 3/04* (2006.01)
(52) U.S. Cl. .................. 323/216; 323/340
(58) Field of Classification Search ......... 323/216, 323/218, 255, 256, 257, 258, 300, 301, 340, 323/341, 343
See application file for complete search history.

(56) References Cited

U.S. PATENT DOCUMENTS

| | | | |
|---|---|---|---|
| 3,821,456 A * | 6/1974 | Havas | 373/150 |
| 5,166,597 A | 11/1992 | Larsen et al. | |
| 5,227,713 A | 7/1993 | Bowler et al. | |
| 5,469,044 A * | 11/1995 | Gyugyi et al. | 323/207 |
| 5,907,239 A | 5/1999 | Pelletier et al. | |
| 6,737,837 B1* | 5/2004 | Halvarsson et al. | 323/205 |
| 2008/0157748 A1* | 7/2008 | Berggren et al. | 323/356 |
| 2008/0258559 A1* | 10/2008 | Berggren et al. | 307/31 |
| 2008/0265848 A1* | 10/2008 | Berggren et al. | 323/211 |
| 2009/0134850 A1* | 5/2009 | Berggren et al. | 323/215 |
| 2009/0218993 A1* | 9/2009 | Berggren et al. | 323/205 |
| 2009/0251932 A1* | 10/2009 | Owen | 363/44 |

OTHER PUBLICATIONS

Bridenbaugh et al, "Voltage control improvement through capacitor and transformer tap optization", Feb. 7, 1992 IEEE transactions on powwer systems, No. 1, pp. 222-227.*
Bjelogrlic et al, "Application of Newtons optimal power flow in voltage/reactive power control", 1989 IEEE, pp. 105-111.*
Larsen, "A classical approach to consrtructing a power flow controller", 1999 IEEE, pp. 1192-1195.*
Gerbex et al, "optimal location of muti-type FACTS devices in a power system by means of genetic algorithms", Aug. 2001 IEEE transactions on power systems, vol. 16, No. 3, pp. 537-544.*
PCT/ISA/210—International Search Report.
PCT/ISA/237—Written Opinion of the International Searching Authority.

* cited by examiner

*Primary Examiner*—Jeffrey L Sterrett
(74) *Attorney, Agent, or Firm*—Venable IP; Eric J. Franklin

(57) ABSTRACT

An apparatus for controlling the power flow in a high voltage network. A phase shifting transformer includes a tap changer.

19 Claims, 6 Drawing Sheets ical Field

The present invention concerns an apparatus and a method for controlling the power flow in an ac transmission system. More precisely the invention concerns a control apparatus comprising a phase shifting transformer (PST). By a phase shifting transformer should in this context be understood to include a single cored as well as a multiple cored transformer, both of which may comprise a symmetric or an asymmetric design. The phase shifting transformer may also comprise additional voltage regulating means.

BACKGROUND OF THE INVENTION

A phase shifting transformer is previously known for controlling the power flow in an ac transmission line. Such PST comprises a tap changer that serially connect or disconnect additional windings of the transformer. By doing so the phasor orientation is controlled. Power is then moved from adjacent phases to a single phase by connections between windings excited by different parts of the magnetic circuit. In a pure phase shifting transformer a voltage in quadrature to the source voltage is injected into the line.

A phase shifting transformer may be used to control the load distribution between parallel lines to increase total power transfer. Advantageous is the phase shifting transformers capability to block parasitic power flow due to phase angle difference in a feeding network.

Power may be distributed to customer in a defined way and circulating power flows may be avoided.

The use of a PST is advantageous in that it has a relatively low reactive power consumption. There is no risk of a subsynchronous resonance (SSR) and it is powerful also at low current conditions.

The use of a PST however offers a slow control speed. The tap changer has to go through every tap position in a sequential manner. Each tap change is effected in the order of 3-5 seconds. Thus the PST cannot participate in a decisive way in a transient period following a power disturbance. Further frequent tap changing, in particular at high current conditions, increases the need for maintenance.

The tap changer is a mechanical device and thus slow and an object to mechanical wear. It has a maximum regulation voltage range of 150 kV and a maximum number of operating positions of less than 35. The maximum tap voltage is in the order of 4000-5000V/tap and the maximum rated through current is about 3000-4500 A. The maximum power handling capacity is 6000-8000 kVA/tap and there is a short circuit thermal limit. Small voltage steps make many operations.

Another way to control the power flow in an ac transmission line is the use of a controlled series compensator (CSC). Such CSC comprises one or a plurality of thyristor switched inductive devices. The CSC may also comprise one or a plurality of thyristor switched capacitive devices, often in combination with an inductor. The capacitive device or the inductive device is connected in a parallel branch with a thyristor switch. By controlling the thyristor switch the inductive or the capacitive device is connected or disconnected to the transmission line. Thus the phasor orientation is controlled by connecting or disconnecting a desired number or combination of inductances or capacitances. The regulation is rapid since there is no mechanical devices involved.

A CSC is controllable from full inductive to full capacitive regulation, and vice versa, within a few fundamental frequency cycles and is thus capable of being a powerful control device in the transient period following a power disturbance. In comparison with a tap changer of a PST the CSC is not maintenance sensitive to frequent control actions. A CSC is therefore suitable for closed loop control.

However in circuit comprising a CSC with capacitive steps there is a risk for resonance problems such as SSR. The CSC has a larger reactive power consumption with large inductive steps in comparison to a PST. At low current conditions the CSC has a small impact on the power flow.

SUMMARY OF THE INVENTION

A primary object of the present invention is to provide a power flow control of an ac power transmission that is rapid and that does not involve the drawbacks of the single use of either a PST or a CSC.

This object is achieved according to the invention by a control apparatus or by a method.

According to the invention a PST containing a tap changer, a CSC containing an inductor, and a control unit that controls both the PST and the CSC are combined to form a control apparatus for controlling the power flow in a high voltage network. As a response to a change in the load conditions the power flow is controlled by firstly regulating the CSC and secondly regulating the PST by the tap changer. In a first period of time the control is effected solely by the CSC device and in a second period of time the control is effected by a combined regulation of both the CSC device and the PST. By this control the slow control capability of the PST is compensated for by the rapid capability of the CSC. For every change from one tap to another of the tap changer the CSC is controlled to compensate for the new tap position. Thus a favorable working condition of the apparatus may be achieved within the controlling ranges of the PST and the CSC. In a first embodiment of the invention the CSC comprises a thyristor switched inductor function. In a further embodiment of the invention the CSC comprises a thyristor switched capacitor function which may be combined with an inductor function.

In a first aspect of the invention the object is achieved by a control apparatus comprising a PST including a tap changer, a CSC including a controllable inductive means, and a control system containing computer means including a processor for controlling the PST and the CSC in coordination. In a preferred embodiment the CSC also contains a controllable capacitive means. In a further embodiment the controllable inductive means comprises a plurality of inductive units, each comprising an inductor in a parallel connection with a thyristor switch. In yet a further embodiment the capacitive means comprises a plurality of capacitive units, each comprising a capacitor in parallel connection with a thyristor switch. In yet a further embodiment the capacitive unit comprises an inductor in series with the thyristor switch. The control system comprises in a further embodiment a communication unit by which the control is supervised, controlled or overridden by an operator or a customer.

In a second aspect of the invention the objects are achieved by a method for controlling the power flow in an ac transmission line, the method comprising a first step in which the new load demand is rapidly regulated by the CSC and a second step in which a combined regulation of both the PST and the CSC is evaluated. In a further step an internal regulation of a favorable working point for both the PST and the CSC is accomplished by regulating the PST in coordination with the CSC such that the external control is unaffected.

The PST which is regulated in sequential steps by the tap changer is according to the invention combined with a CSC which is regulated by thyristor switches, to provide a fast and adaptive control of the power flow by a common control system. The slow control capability of the PST is compensated for by the rapid control of the CSC. The PST is thus dynamically assisted by the CSC when regulating. This dynamically assisted PST, in the following text denoted DAPST, comprises a standard tap changer controlled phase-shifting transformer combined with thyristor switched inductive and/or capacitive reactance circuits. Each such circuit may comprise a plurality of inductive and capacitive circuits which may be connected in steps. The dynamic assistance of the PST reduces the number of control actions made by the tap changer, which dramatically increases the life time cycle of the tap changer.

According to the invention the required rating of a power flow controller (PFC) is divided into two parts, one part consisting of the PST and the other part consisting of the CSC containing thyristor switched reactance circuits. The possibility to coordinate the control of the CSC and the PST offers the rating of both units to be smaller than in circuits where each unit works alone. As a comparison a single PST regulating unit would have to have a large rating and a single CSC unit would have to have an increased number of reactance circuits. The combination will obtain an overall improvement of the performance as compared to both the PST and the thyristor switched reactance steps only.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
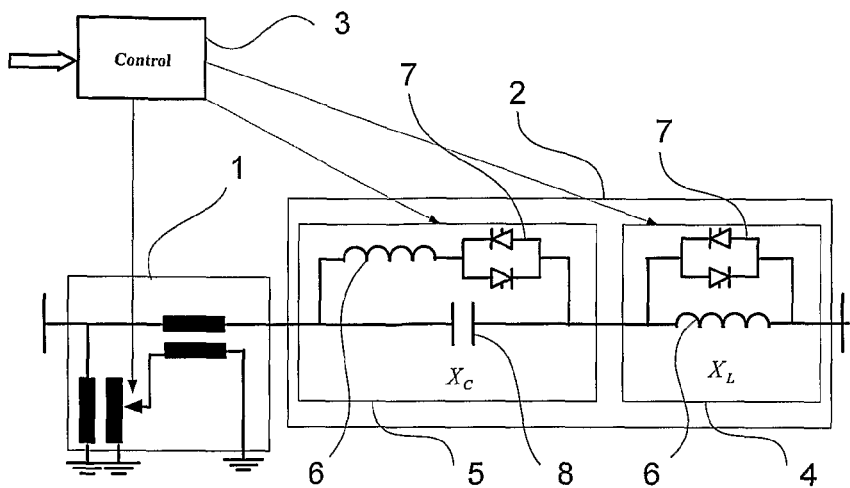
FIG. 1 is a principal circuit of a control apparatus according the invention.
Figure 15:
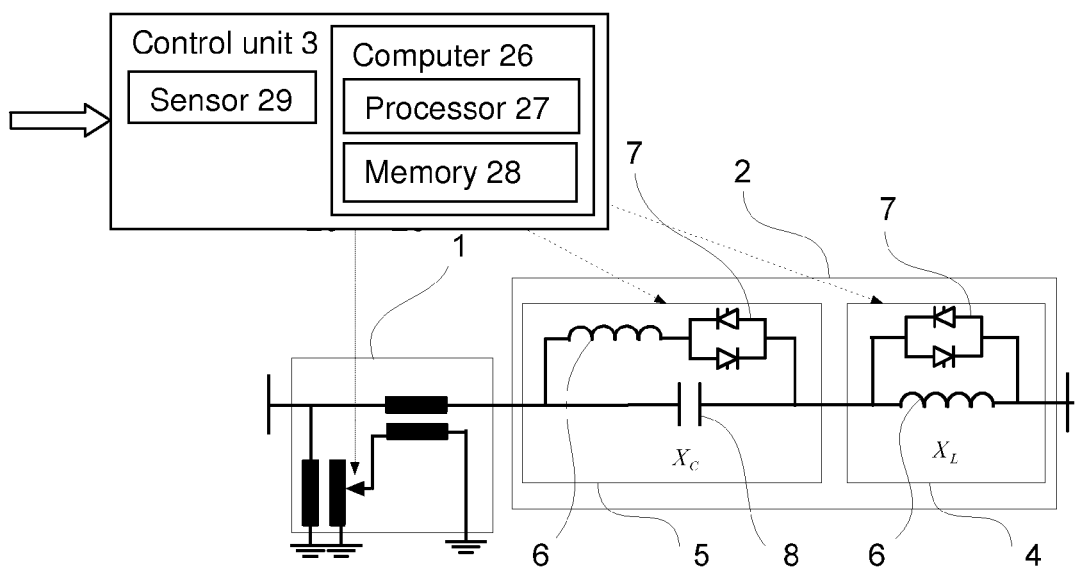
FIG. 15 is an apparatus with a control unit that includes a computer including a processor and a memory unit and a sensor for sensing the power flow of the network.

An apparatus for controlling the power flow according to the invention is shown in FIG. 1. The apparatus comprises a tap changer controlled phase shifting transformer (PST) 1, a controlled series compensator (CSC) 2 and a control unit 3. The CSC comprises a first reactance unit 4 that includes an inductive unit 6 and a thyristor switch 7 for connecting and disconnecting the inductive unit. In the embodiment shown the CSC 2 also comprises a second reactance unit 5 that includes a capacitive unit 8 as well as a inductive unit 6 that are controlled by a thyristor switch 7. The single inductive and capacitive reactance units are shown by way of example. It lies within the scope of the invention to combine any number of inductive and capacitive steps. Thus the controlled series compensation device may comprise a plurality of both inductive and capacitive circuits. The control unit 3 may include a computer 26 including a processor 27, a memory unit 28 and a sensor 29 for sensing the power flow of the network, as shown in FIG. 15.

The CSC may be realized in different configurations. In a first embodiment the CSC comprises switchable inductive units by which the CSC is controllable in discrete steps. In a second embodiment the CSC comprises a combination of inductive and capacitive units and thus being controllable in discrete steps. In a third embodiment the CSC comprises a plurality of inductive step and a plurality of boostable capacitive steps that offers the CSC to be continuously controllable.

In a one-sided discrete embodiment of the invention the CSC comprises only inductive units. In this embodiment there is thus no risk of resonances (e.g. SSR). Assuming that the two inductive steps are thyristor switched and that $$X_{L2}=2X_{L1}$$

Figure 2:
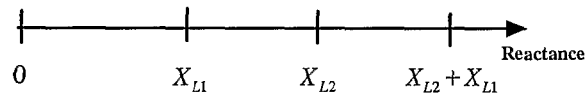
FIG. 2 is a one sided discrete function of the apparatus.

The CSC units have thus an inductive control range divided into discrete steps as illustrated in the FIG. 2.

The control of the power flow by the PST is accomplished through control of the tap-changer. Since this is a mechanic device and the control has to be done in sequential steps this control is slow. For the CSC each of the four positions in FIG. 2 may be assumed rapidly.

In a further embodiment of the invention the CSC comprises a plurality of both inductive and capacitive units. The discrete controlling capability is illustrated in the following way. Assume that both the capacitive step and the two inductive steps are thyristor switched (i.e. no boosting which produces harmonics), and that $$X_{L2}=2X_{L1}$$

$$|X_{L2}|=|X_C|$$

Figure 3:
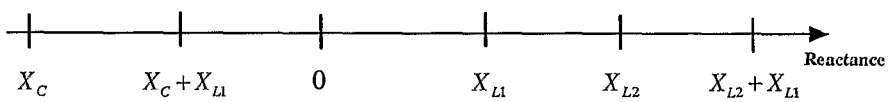
FIG. 3 is a discrete control function of the apparatus.

The CSC parts have thus an inductive and capacitive control range divided into discrete steps as illustrated in the FIG. 3.

A continuous controllable embodiment according to the invention is illustrated in the following way (the number of steps can of course be changed) In this embodiment the CSC comprise a plurality of inductive units and a plurality of capacitor units that are continuously controllable (boostable). Assume that the capacitive part is boostable such that it is continuous controllable between $$|X_{CB}^{max}| \geq X_{CB} \geq |X_{CB}^{min}| \text{ where } X_{CB}^{max}=2X_{CB}^{min}$$

and that the inductive part is divided into two parts, $X_{L1}$ and $X_{L2}$, where $$|X_{L1}| = |X_{CB}^{min}|$$

$$X_{L2} = 2X_{L1}$$

Figure 4:
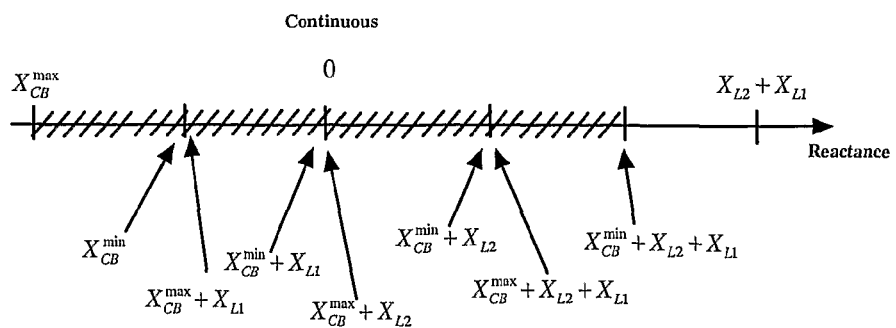
FIG. 4 is a continuous control function of the apparatus.

The CSC parts are thus continuous controllable in the range illustrated in FIG. 4.

The control resolution of the apparatus according to the invention (the combined effect of tap changer and CSC control action) is in this embodiment made infinite over a large portion of the combined control range.

Figure 13:
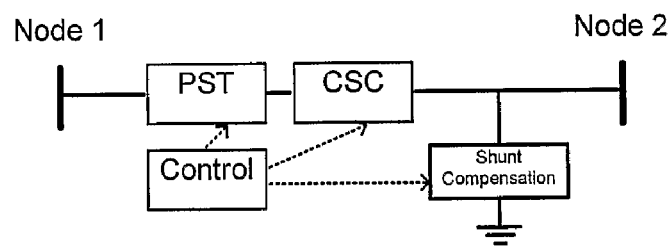
FIG. 13: is an apparatus combined with shunt compensation means.

In a further advanced embodiment of the invention means for reactive power shunt compensation is included, as indicated in FIG. 13, such that the reactive power balance of the DAPST may be customized to meet the a particular power system requirements. These means include devices such as for instance circuit breaker connected capacitor banks and reactors, static var compensators (SVC) and STATCOM.

Figure 5:
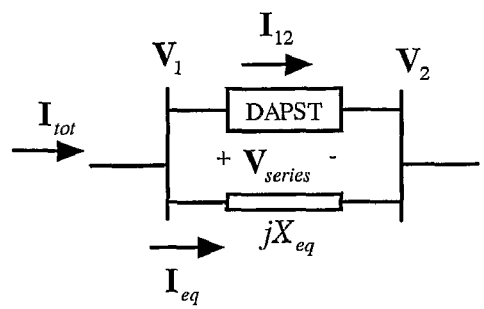
FIG. 5 is a simple network comprising the apparatus.

In order to illustrate the operating range of a DAPST a simple network as shown in FIG. 5 is used. The network comprises a DAPST according to the invention in a parallel connection with an equivalent reactance between a first node 14 and a second node 15. The purpose of a DAPST is to control the distribution of power between on one hand the path in which it is installed and on the other hand parallel paths. The parallel paths are in FIG. 5 represented by the equivalent inductive reactance $X_{eq}$ connected in parallel to the DAPST. By controlling the series voltage $V_{Series}$ the distribution of power flow can be controlled.

The bold faced quantities in FIG. 5 represent phasors (with both a magnitude and a phase). Currents are represented with I and voltages with V.

Figure 6:
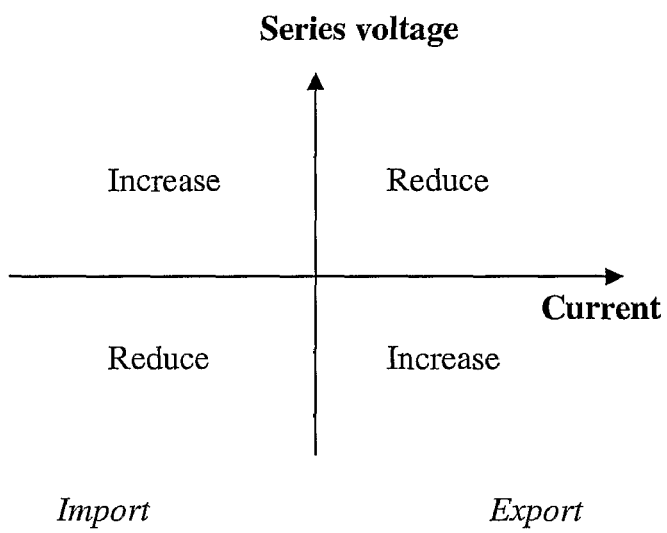
FIG. 6 is the operating range in terms of series voltage and throughput current.

With this simple network, the operating range may be described in a diagram as indicated in FIG. 6, where the current through the DAPST is on the x-axis and the series voltage is on the y-axis.

The left half plane corresponds to current (power) flowing from the second node 15 to the first node 14 (called import) and the right half plane corresponds to current (power) flowing from the first node to the second node (called export). The first and third quadrant correspond to a reduction of the magnitude of the current (power) whereas the second and fourth correspond to an increase of the magnitude of the current (power).

Figure 7:
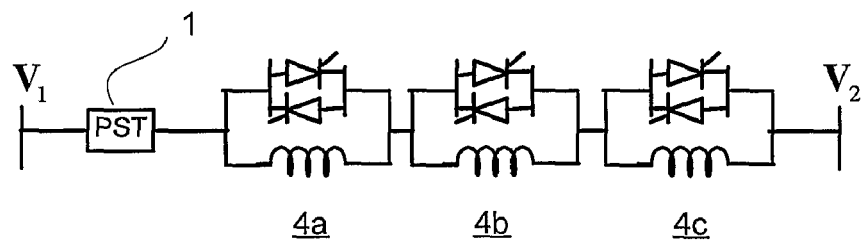
FIG. 7 is the control apparatus including a CSC-part comprising three inductive thyristor switched units.

A DAPST comprising a PST 1 and a CSC including a plurality of switched inductive units 4a-4c as indicated in FIG. 7, it may be operated in a purely Controllable Series Compensator (CSC) mode with the Phase-Shifting Transformer (PST) at zero tap position (which implies that only the short circuit reactance of the PST contributes to the series voltage.)

Figure 8:
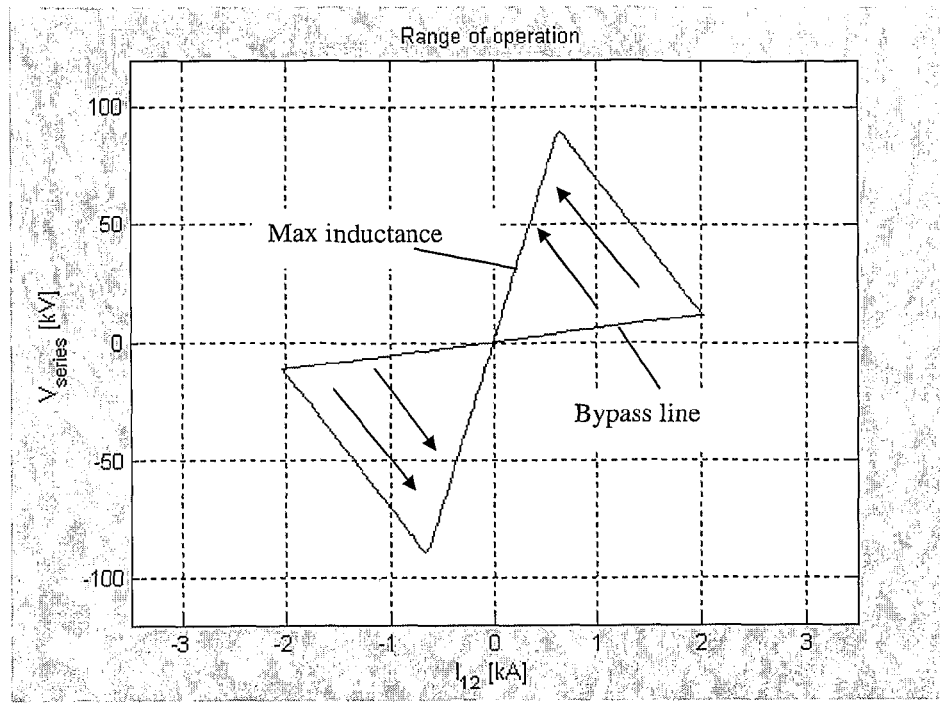
FIG. 8: is the operating range in purely inductive CSC mode.

FIG. 8 illustrates the operating range in purely inductive CSC mode. Along the bypass line all CSC steps are thyristor by-passed. The slope of the line depends on the short circuit reactance of the PST.

Starting from the by-pass line, the voltage across the CSC is increased and the current through the DAPST is reduced by switching in inductive steps. The operating point will thus move along lines parallel to the arrows in FIG. 8 (the slopes of the arrows will depend on the size of $X_{eq}$). By giving the inductive steps different sizes (e.g. binary sizes) and adding additional steps the resolution of control can be made arbitrarily high. The CSC will typically be dimensioned such that operation is only allowed for series voltages across the individual steps below limits that are predetermined. When all inductive steps are switched in, the series voltage will decrease if the current decreases further. It can be noted that for low currents, the CSC is quite powerless as hardly any series voltage can be provided even if very large inductive steps were available. In a similar fashion, capacitive steps would give an operational range in the second and forth quadrants.

Figure 9:
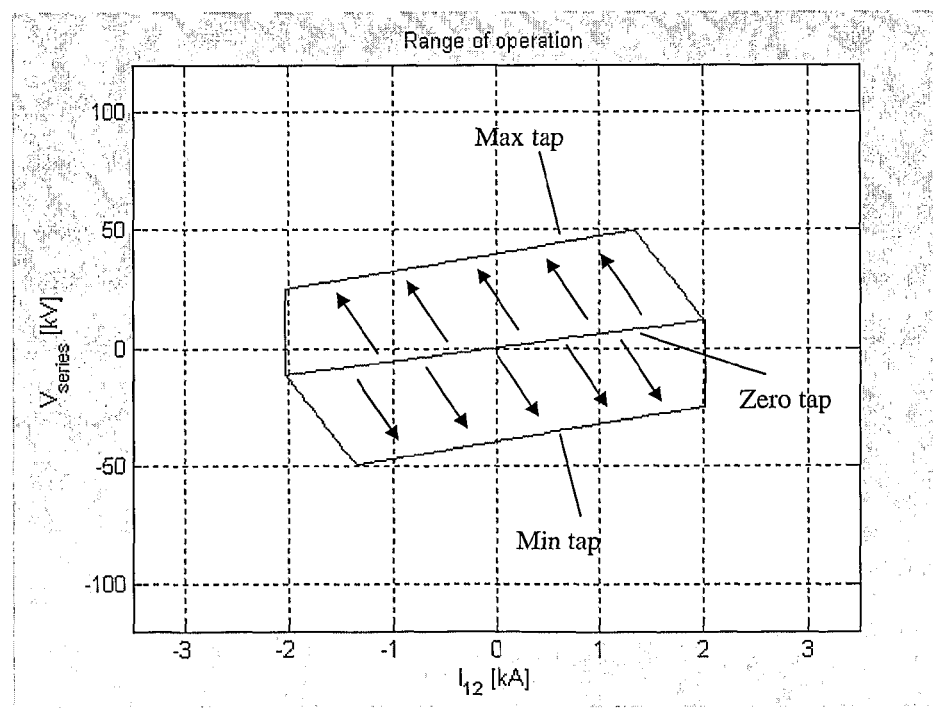
FIG. 9: is the operating range in purely PST mode.

With the CSC part thyristor by-passed (both inductive and possibly capacitive steps) the DAPST may be operated in a pure PST mode. The operating range may then look as indicated in FIG. 9.

The zero tap line is the same as the by-pass line in FIG. 8, i.e. its slope depends on the short circuit reactance of the PST. Starting from the zero tap line, the series voltage increases in the positive direction when the tap-changer is moved towards the most positive position and the magnitude of the series voltage increases in the negative direction when the tap-changer is moved towards the most negative position. It can be noticed that this PST has the ability to both decrease the power flow (first and third quadrant operation) and increase the power flow (second and fourth quadrant operation) as compared to the zero tap line. Furthermore, the PST has a substantial capability to control the power flow also at low current conditions.

Figure 10:
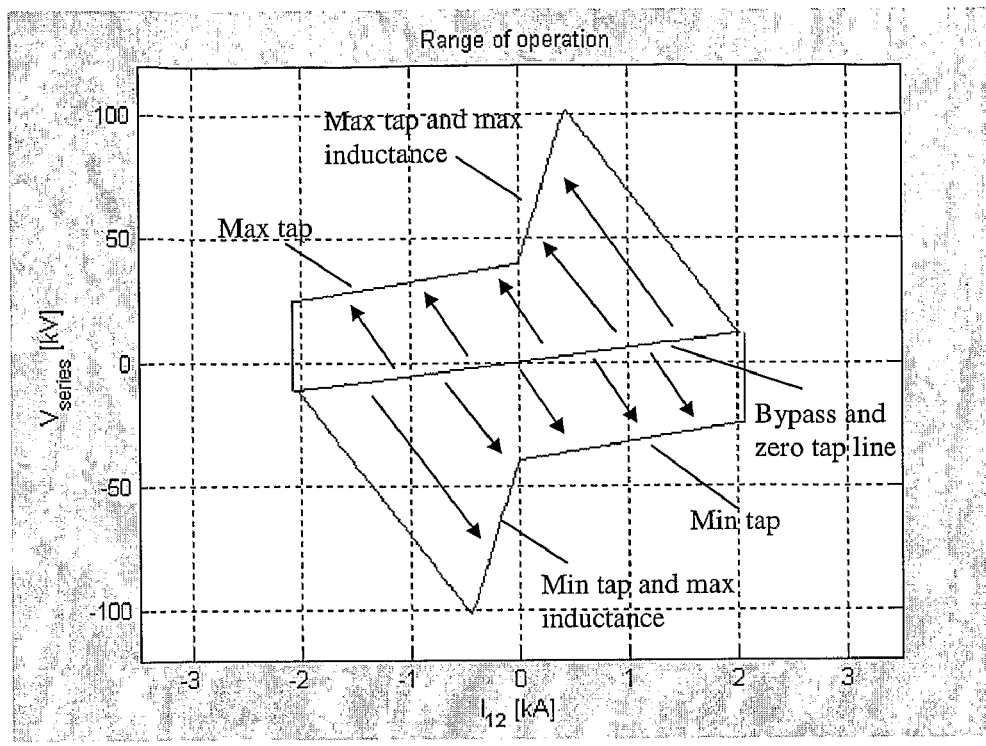
FIG. 10: is the steady state operating range of the apparatus.

FIG. 10 illustrates the DAPST steady state control range when both the PST and the inductive CSC ranges are combined.

With the choice of inductive CSC steps, the operating range is extended in the first and third quadrants (corresponding to reduction of power) as compared to the pure PST mode. With capacitive CSC steps it is in a similar fashion possible to extend the operating range in the second and fourth quadrant.

With dynamic operating range it is meant the part of the operating range that can be controlled fast enough to mitigate the consequences of electromechanical transients in a power system. As the thyristor controlled CSC easily can change operating point from minimum inductive (or maximum capacitive if capacitive steps are available) to maximum inductive within a fraction of a second, it is well suited for contributing to e.g. damping of power oscillations originating from electromechanical oscillations in synchronous machines (generators). The PST on the other hand, where each step takes in the order of five seconds and each step must be sequentially passed, is too slow to actively contribute in the transient period. In other words, the dynamic part of the operating range of he DAPST corresponds to the CSC part.

However, by controlling the tap-changer in the pre-disturbance situation the over-all characteristics of the DAPST can be changed. FIG. 8 of course gives the dynamic range with the PST in zero tap position.

Figure 11:
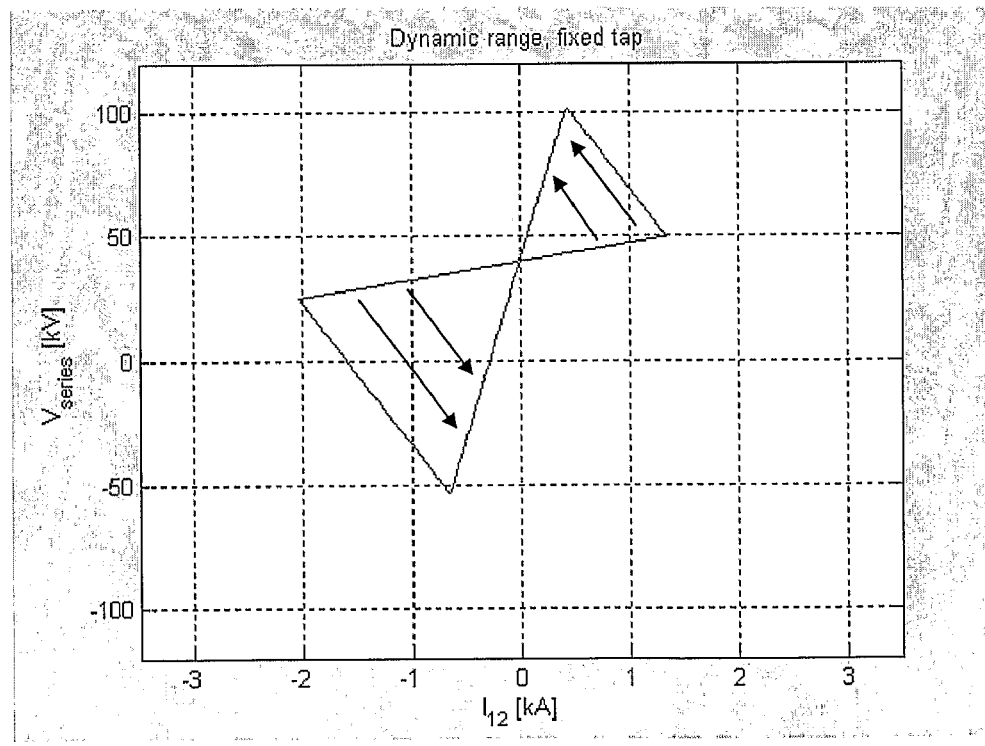
FIG. 11: is the dynamic range of the apparatus with PST in maximum tap position.
Figure 12:
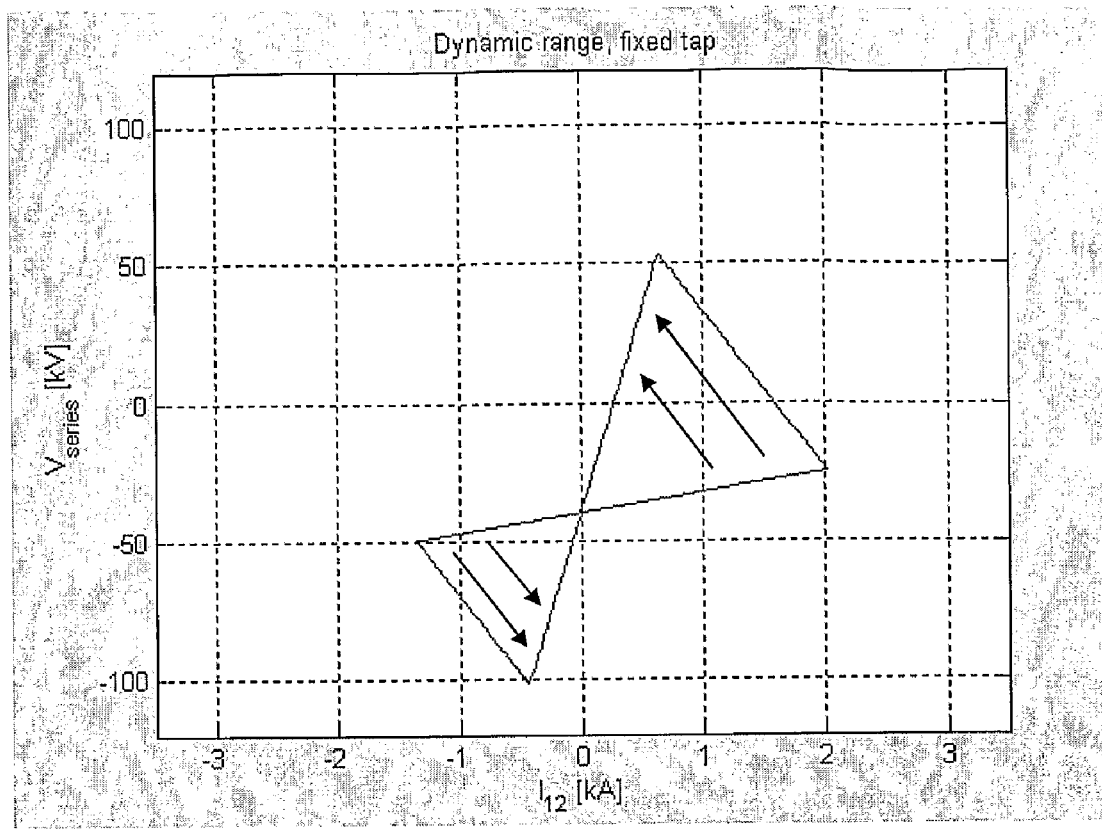
FIG. 12: is the dynamic range with PST in minimum tap position.

In FIG. 11 the PST is in the maximum tap position. It can be noted that in the import situation (negative throughput currents), the DAPST has the over-all dynamic characteristic of being capable of both increasing and decreasing the power flow dynamically (in other words, the line $V_{series}=0$ passes through the dynamic operating range). Of course a similar feature can be achieved in the export situation by setting the PST in e.g. the minimum tap position, as indicated in FIG. 12.

It is consequently possible to give the DAPST the possibility to dynamically both increase and decrease the power flow. The circumstance that this is achievable with an inductive CSC, i.e. without a series capacitor, is a major advantage in systems with thermal production plants, e.g. nuclear power plants, with complex turbine strings. As is well-known installation of series capacitors in such systems requires substantial analysis and adequate control means to avoid the risk of sub-synchronous resonance which may seriously damage the production units.

In particular, if a DAPST with an inductive CSC also includes means for capacitive shunt compensation, such as capacitor banks connected with circuit breakers, as indicated in FIG. 13, the DAPST can be given characteristics very similar to a controllable series capacitor, also in terms of reactive power balance, without the risk of e.g. sub-synchronous resonance.

The main control objectives, i.e. the reasons for installing a control apparatus, which may be denoted a dynamically controllable phase shift transformer (DAPST), include one or several of the following;

Slow/quasi-steady state power flow control
Power oscillation damping
Improving transient performance through fast change of transmission corridor characteristics Slow/quasi-steady state power flow control is the slow control of the distribution of power between on one hand the transmission path in which the DAPST is installed and on the other hand parallel paths. The control speed requirements for meeting this objective are low enough to be satisfied by both the PST and the CSC parts.

Power oscillation damping is the fast control of the DAPST to mitigate power oscillations typically following a disturbance in the power system. The frequency of these oscillations are typically in the range of 0.1-2.0 Hz and depends to a large extent on the inertia constants of the synchronous machines (typically generators) or groups of machines participating in the oscillation. The control speed requirement to meet this objective can only be satisfied by the CSC part of the DAPST.

By quickly, within a fraction of the transient period following a disturbance, changing the operating point of the CSC part of the DAPST, the character of the transmission interconnection on which the DAPST is installed can be changed. In its most inductive position the total reactance of the transmission interconnection is at its maximum resulting in a reduced power transfer over the interconnection and an increased power transfer over parallel paths. In its most capacitive (or least inductive) position the total reactance of the interconnection is at its minimum resulting in an increased power transfer over the interconnection and a reduced power transfer over parallel paths. In particular if several DAPST are installed and their controls are coordinated, the disturbed part of the system experiencing e.g. stability problems can quickly be relieved of power transfer whereas an intact part of the system picks up the power transfer. By having the capability to go between end positions within say less then 0.5 s after the disturbance occurs, the transient performance of the overall inter-connected system can thus be significantly improved. The PST part is too slow to act within this time frame however its pre-disturbance operating point will affect the overall character of the DAPST and thus the transmission interconnection.

By coordinating the control of the tap-changer and the thyristors, it is also possible to include one or several of the following advantageous control objectives in the control strategy:

Operation of the tap-changer at lowest possible current
Smallest possible number of tap-changer operations
Reactive power consumption control (limitation)
Dynamic range control By controlling the DAPST at high current conditions such that the CSC part primarily acts first to reduce the current and then the PST part acts primarily at lower current conditions, the stresses on the tap-changer are relieved and the need for maintenance is reduced.

By letting the CSC part be as fast as possible, and slowing down the PST part even more than it is by nature, the number of tap-changer operations can be reduced. This is accomplished as changes in loading with short duration are handled by the CSC part and the PST part only acts on changes of longer duration.

The PST part consumes reactive power due to its short circuit reactance, which only has a small variation due to tap-changer position as compared to the CSC which reactance has a substantially larger variation due to its nature. The CSC may as a consequence consume or produce a considerable amount of reactive power if all inductive or capacitive steps are switched in. As almost the whole operating range can be reached with different mixes of PST and CSC control action the overall consumption or production of reactive power can be affected. If e.g. the power system for some reason is weak in terms of voltage support, i.e. the voltages are low it is advantageous to produce reactive power or at least limit the overall consumption of reactive power of the DAPST. If the desired series voltage can be achieved through the combined action of capacitive CSC steps (if available) and PST, as much CSC action and as little PST action is advantageous. If the desired series voltage only can be achieved through the combination of inductive CSC steps and PST action, as much PST action and as little CSC action is advantageous. Similarly, if the voltages are high it is advantageous to consume reactive power or at least limit the overall production of reactive power of the DAPST. Obviously the opposite control strategy is to be preferred, i.e. if the desired series voltage can be achieved through the combined action of inductive CSC and PST, as much CSC action and as little PST action is advantageous. If the desired series voltage only can be achieved through the combination of capacitive CSC steps (if available) and PST action, as much PST action and as little CSC action is advantageous. In addition it is possible to control the over all reactive power balance if means for reactive power shunt compensation is added to the DAPST as mention above.

Yet another advantageous control objective is the control of dynamic range at low current conditions. At low line currents the control range of the CSC part becomes small and even zero. By controlling the PST part such that there almost always is a minimum line current available, a minimum dynamic range is consequently also almost always available. (There may be a short time period with low current when the power direction is changed from import to export, but this time period can be made very short by proper control of the tap-changer.)

Figure 14:
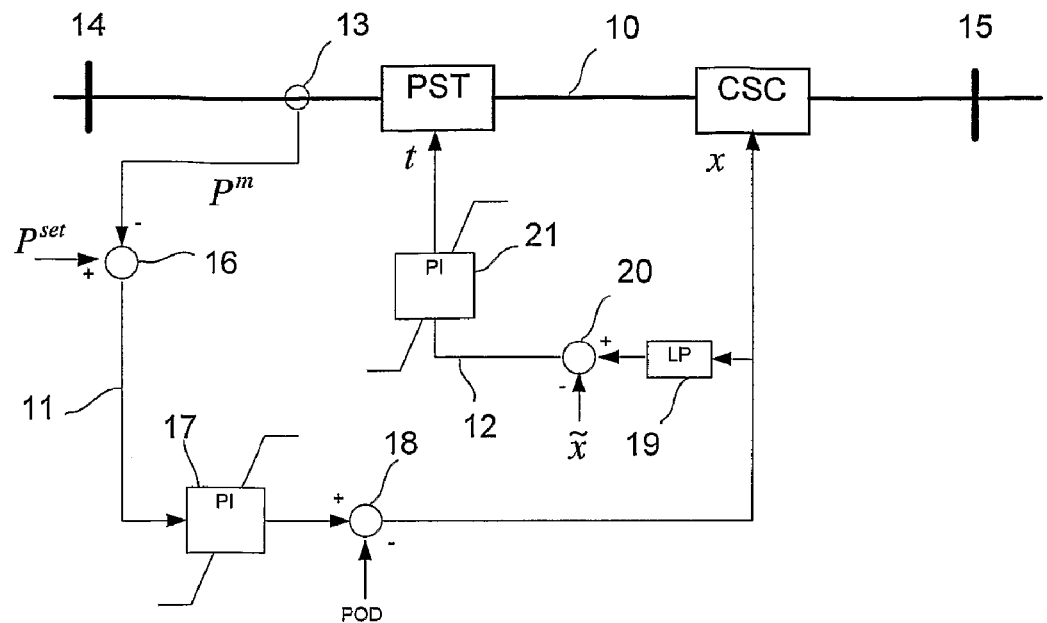
FIG. 14 is a conceptual control scheme of the apparatus.

A control scheme of a DASPT for controlling the power flow according to the invention is shown in FIG. 14. In the embodiment shown the DAPST comprises PST and a CSC arranged on a power transmission line 10, a first closed loop 11 and a second closed loop 12. The first closed loop comprises a sensor 13 for sensing the power flow on the line 10 between a first node 14 and a second node 15. Further the first loop comprises a first comparator 16, a PI (Proportional-Integrate) controller 17 and a second comparator 18.

The measured active power flow, $P^m$, is compared with a set value, $P^{set}$, corresponding to the desired active power flow. A difference signal is sent to a PI controller with limits. The PI-controller creates a signal proportional to the required reactance which is sent to the thyristor control of the CSC, which by these means is controlled to satisfy the set value of active power flow. The discrete nature of the CSC will in most situations result in a control error which is handled through dead-bands (not indicated in the drawing).

A supplementary signal for Power Oscillation Damping (POD) may be added after the PI controller such that fast electromechanical power oscillations can be mitigated by CSC action.

The second closed loop for controlling the PST comprises a low pass 15 filter 19, a comparator 20 and a PI-controller 21. The signal proportional to the required reactance is sent through the low-pass filter 19 for comparison to a set value of the reactance, $\tilde{x}$. The low-pass filter will block variations of in x of short duration. The difference between the actual value of x and the desired value $\tilde{x}$ is sent to a PI 20 controller with limits which creates a signal proportional to the desired tap, t, which is sent to the tap-changer control.

It is possible to achieve all control objectives listed above by application of the control scheme in FIG. 14.

Slow/quasi-steady state power flow control is obviously achieved.

Power oscillation damping is achieved by introduction of the supplementary POD signal.

Fast change of transmission corridor characteristics can be achieved by quickly changing the set point $P^{set}$, possibly combined with changing the gain of the first PI-controller.

Operation of the tap-changer at high current conditions is avoided in the following way. If the current suddenly increases, in particular into the overload range, the CSC will first act to reduce the current, and then at lower currents the PST will act to satisfy the set value $\tilde{x}$.

The number of tap-changer operations is reduced by the introduction of a low-pass filter in the tap-changer control branch. This filter will block changes of short duration and thus reduce the number of tap-changer operations.

Reactive power balance control (limitation) can be realized in at least two ways. By changing the set value $\tilde{x}$ the reactive power balance can be controlled, and by introducing reactive power limits in the first PI-controller limiter it can be limited.

Control of the dynamic range at low current conditions can be accomplished by control of the set value $P^{set}$. By using a limit $p^{set,limit} < |P^{set}|$ a minimum magnitude of the line current, and thus a minimum control range, can be realized in steady state.

Other control schemes can of course also be used to meet the control objectives.

Although favorable the scope of the invention must not be limited by the embodiments presented but contain also embodiments obvious to a person skilled in the art. For instance the transmission line between the PST and the SCS must not be short as indicated in the accompanied figures but comprise any length as only the PST and the SCS is serially connected. The closed loop arrangement in FIG. 13 must not be fully closed. Thus it may under certain conditions be favorable for an operator or a customer to choose a desirable working point by direct adjustment of the tap changer of the PST. According to the invention the apparatus would automatically respond to such a forced control of the PST by adjusting the CSC correspondingly.

The invention claimed is:

1. An apparatus for controlling a power flow in a high voltage network, comprising
a phase shifting transformer, comprising a tap changer,
a controlled series compensator containing a controllable inductor unit, and
a control unit configured to control the phase shifting transformer and the controlled series compensator in coordination.

2. The apparatus according to claim 1, wherein the controllable inductor unit comprises at least one unit comprising an inductor device in parallel connection with a thyristor switch.

3. The apparatus according to claim 1, wherein the controlled series compensator comprises a controllable capacitor unit.

4. The apparatus according to claim 3, wherein the controllable capacitor unit comprises at least one unit comprising a first branch comprising a capacitive device and a second branch connected in parallel to the first branch comprising a thyristor switch.

5. The apparatus according to claim 4, wherein the second branch comprises an inductor device in series with the thyristor switch.

6. The apparatus according to claim 3, wherein the controlled series compensator comprises a plurality of inductive units and a plurality of boostable capacitive units.

7. The apparatus according to claim 1, wherein the control unit comprises a first loop for controlling the controlled series compensator.

8. The apparatus according to claim 1, wherein the control unit comprises a second loop for controlling the phase shifting transformer.

9. The apparatus according to claim 1, wherein the control unit comprises an introducing unit configured to introduce control parameter values.

10. The apparatus according to claim 1, wherein the phase shifting transformer is positioned at a first location and the controlled series compensator is positioned at a second location and wherein the first and second location is separated by a distance.

11. The apparatus according to claim 1, further comprising:
a shunt compensator.

12. The apparatus according to claim 11, wherein the control unit comprises a shunt compensator configured to control the shunt compensator.

13. The apparatus according to claim 1, wherein the control unit comprises a computer including a processor and a memory unit and a sensor for sensing the power flow of the network.

14. A method for controlling a power flow in a high voltage network having a control apparatus including a phase shifting transformer, the method comprising:
adjusting in a first period of time a reactance of the control apparatus by a controlled series compensator, and
adjusting in a second period of time a voltage of the phase shifting transformer and the reactance of the control apparatus to achieve a favorable working balance between the phase shifting transformer and the controlled series compensator.

15. The method according to claim 14, wherein the controlled series compensator adjustment comprises sensing the power flow, comparison with a set value, adjustment by a PI-controller and comparison with a oscillation damping signal.

16. The method according to claim 15, wherein the phase shifting transformer adjustment comprises filtering a control signal from the controlled series compensator adjustment, comparison with a reactance set value and adjustment by a PI-controller.

17. A computer program product, comprising:
a computer readable medium; and
computer program instructions recorded on the computer readable medium and executable by a processor to carry out a method comprising adjusting in a first period of time a reactance of a control apparatus by means of a controlled series compensator, and adjusting in a second period of time a voltage of a phase shifting transformer and the reactance of the control apparatus to achieve a favorable working balance between the phase shifting transformer and the controlled series compensator.

18. The computer program product according to claim 17, wherein the computer program instructions are further for carrying out a method comprising providing the computer program instructions at least in part over a network.

19. The computer readable medium, according to claim 18, wherein the network comprises the internet.

* * * * *